United States Patent [19]

Schmidt et al.

[11] 4,277,295

[45] Jul. 7, 1981

[54] PROCESS OF MANUFACTURING PNEUMATIC TIRES AND APPARATUS FOR CARRYING OUT THE PROCESS

[75] Inventors: Oskar Schmidt, Kittsee; Wladyslaw Kubica, Vienna, both of Austria

[73] Assignee: Polyair Maschinenbau G.m.b.H., Kittsee, Austria

[21] Appl. No.: 73,782

[22] Filed: Sep. 10, 1979

[30] Foreign Application Priority Data

Sep. 8, 1978 [AT] Austria .................................. 6520/78
May 25, 1979 [AT] Austria .................................. 3843/79

[51] Int. Cl.³ .......................................... B29H 17/12
[52] U.S. Cl. ................................ 156/117; 152/362 R; 156/125; 156/397; 264/326
[58] Field of Search ................ 152/357, 358, 362; 156/117, 125, 128 P, 397; 264/501, 257, 259, 260-262, 271, 275, 277, 326

[56] References Cited

U.S. PATENT DOCUMENTS

| 1,315,364 | 9/1919 | Dickinson | 156/117 |
| 1,321,402 | 11/1919 | Stowe | 156/117 |
| 3,229,013 | 1/1966 | Newton et al. | 156/397 |
| 3,375,150 | 3/1968 | Alexeff | 156/117 |
| 3,458,373 | 7/1969 | Knipp et al. | 264/271 |
| 3,606,921 | 9/1971 | Grawey | 156/117 |
| 3,956,448 | 5/1976 | Larson | 264/277 X |
| 4,108,707 | 8/1978 | Appleby et al. | 156/117 |

Primary Examiner—John E. Kittle
Attorney, Agent, or Firm—Oblon, Fisher, Spivak, McClelland & Maier

[57] ABSTRACT

Figure 2:
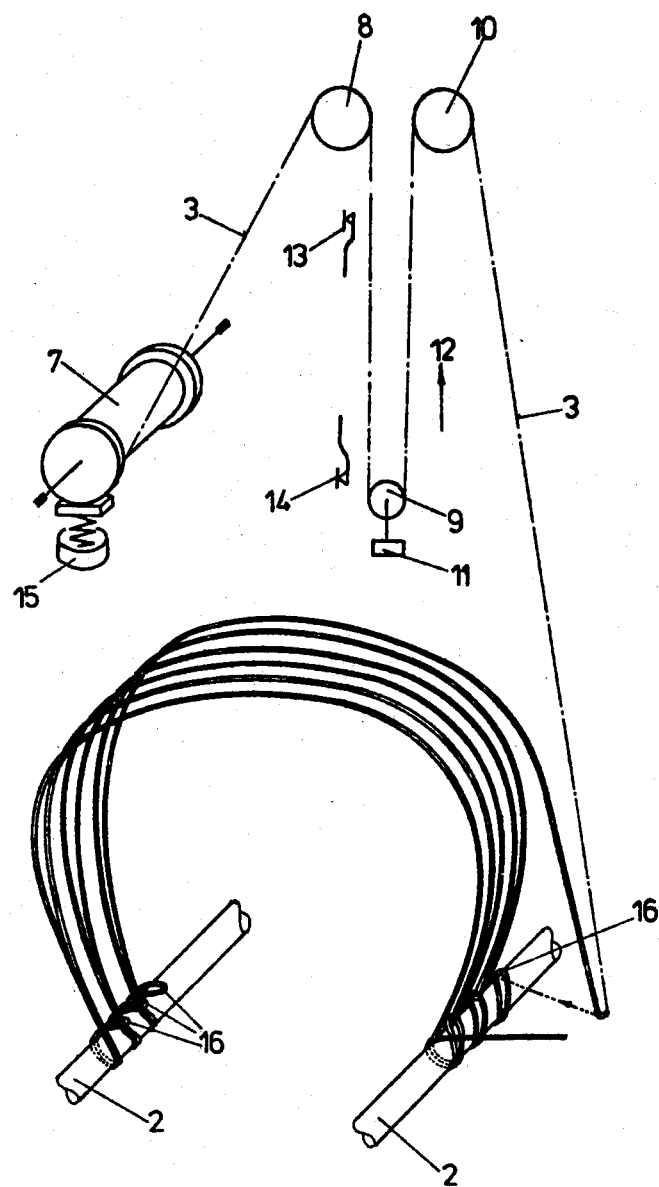

The process for manufacturing pneumatic tires comprises as essential step the manufacture of a tire body by winding cords or cables (3, 23, 35). The cord or cable is withdrawn from a supply reel (7) under constant tension and laid around and anchored to the bead cores (2; 22; 36; 39) arranged at both sides of the tire. In addition a peripherally extending belt is applied which again can be formed by winding cords or cables, and the tire is completed by injection molding or die casting elastomeric material. An apparatus suitable for performing said process comprises in addition to an interior mold (1, 21, 38) two sets of outer molds, the first set allowing the shaping of an inner tire layer provided with protrusions serving as spacers for the winding of cables or cords and the second set corresponding to the external shape of the tire (FIG. 2).

13 Claims, 10 Drawing Figures

PROCESS OF MANUFACTURING PNEUMATIC TIRES AND APPARATUS FOR CARRYING OUT THE PROCESS

This invention relates to a process of manufacturing pneumatic tires made of synthetic elastomers, particularly of polyurethane, and comprising an inner tire layer, a tire body, which is anchored in the inner tire layer by means of bead cores, a belt, and an outer tire layer provided with a tread portion, and to apparatus for carrying out that process. The main part of pneumatic tires consists of the tire body and belt, which reinforce the pneumatic tire in order to take up the internal pressure of the tire and any deformation of the tire in operation so that the tire will not be excessively deformed.

The tire body of conventional pneumatic tires is made from cord strips, which are cut in the desired width from webs of fiber or steel cords coated on both sides with rubber or rubberlike elastomers and are subsequently adhesively joined to form strips in which the direction of the cords has been changed. To anchor the strips in the tire, the cut edges of these strips are folded around and adhesively joined to so-called bead cores, which are structural parts provided for that purpose on both sides of the tire. A disadvantage of the tires made by that process resides in that adjacent to the cut edges of the cord strips which have been reversely folded around the bead cores the side walls may be disintegrated or seriously damaged under excessive loads or when the tire has become deflated.

U.S. Pat. No. 3,606,921 describes a different process, in which a steel or fiber cord or cable is wound around a toroid to form a radial winding. That process depends on the use of special wheel rims, which have been designed only for such tires, and the process can be used only to make large tires for very heavy special vehicles.

It is an object of the invention to provide for the manufacture of tires a process in which the tire body can be made in a simple and particularly economical manner independently of the size of the tire to be made and in which special requirements regarding the strength of the reinforcement can be complied with in a simple manner. It is also an object of the invention to prevent a disintegration of the tire body owing to the separation of the adhesive joints of the cut edges foldes around the bead cores. The object is accomplished according to the invention substantially in that the tire body is made in that a cord or cable is wound radially from one bead core to the other bead core over the periphery of a forming core but spaced from the surface of said forming core while being anchored in alternation on at last one of the two bead cores provided on both sides of the tire by being completely slung around each bead core, that a peripherally extending belt is applied, and that finally the outer tire layer and the tread portion are applied.

In order to arrange the tire body in a position spaced from the inner side of the tire it is possible either to make firstly the inner tire layer and to wind then the tire body around the same or to provide a forming core having suitable spacers as distance ribs which permit to wind the tire body distantly from the inner wall of the tire which is formed subsequently. With this second alternative, the outer layer and the inner layer of the tire can be manufactured together in a combined casting or injection procedure. The inner tire layer made in the first operation may preferably be provided on its outside surface with elevations, particularly annular elevations, which when the radial reinforcement has been applied ensure that the liquid material used for injection molding or casting will more effectively flow through the body so that the latter is anchored more effectively. Because the body is made by an operation in which the cord or cable is anchored in alternation on the bead cores disposed on opposite sides of the tire and for this purpose is completely slung around said bead cores, each portion of the tire body will be under the same initial stress so that the deformation can be taken up uniformly by the entire tire body. The peripherally extending belt can be made in that cable or cord is wound in a peripheral direction. In tires having different sizes and intended for different purposes, the tire body and the belt may be combined so that the tire will meet specified strength requirements. It is sufficient to provide a mold and mold core which correspond to the desired size of the tire. The reinforcement can be varied within a wide range by the selection of the distance between adjacent reinforcing plies. The anchoring of the cable or cord on the bead core by an operation which is similar to crocheting permits a fast and economical making of a tire body which is free from the drawbacks that are inherent in conventional tire bodies because of their adhesive joints. The strength properties of the tire body depend only on the dimensions of the cable or cord plies and on the spacing of such plies, and there is no adhesive joint.

The cord or cable can be anchored to the bead core in a particularly simple manner in that the cable or cord used for a radial reinforcement is laid under constant tension from one bead core to the other over the periphery of the inner tire layer and is slung around each bead core so as to form a loop, the inner tire layer is advanced in the peripheral direction, and a new loop is formed in an operation which is similar to crocheting in that the cable or cord laid over the periphery of the inner tire layer is threaded through the previously formed adjacent loop and is thus connected to the bead core.

To facilitate the slinging of the cable or cord completely around the bead cores, the latter are preferably spaced from the outside surface of the inner tire layer. This can be accomplished by the use of spacers, which are spaced around the periphery of the inner tire layer, or by the provision of a bead core holder on the mold. Each spacer provided on the outside surface of the inner tire layer may be removed when the cable or cord has been laid around the adjacent portion of the bead core. In that case the desired tension of the cable or cord can be exactly controlled. When the radial reinforcement has been applied, the bead cores can be anchored on the periphery of the inner tire layer, e.g., by cables or wires so that the bead cores will be held in position in the mold. Alternatively, the outer mold may be provided with interior parts which cooperate with the bead cores so as to hold them in position and to ensure a desired initial stress of the radial reinforcement.

In the manufacture of tires in which the inner tire layer has a curved portion which bulges laterally outwardly beyond the bead core to a radius which is larger than the radius of the bead cores, it is possible in accordance to the invention to omit the spacers and to arrange at least one bead core initially at such a distance from the outside surface of the inner tire layer that the shortest connecting line from said bead core on the periphery of the inner tire layer to the other bead core is as long as the shortest connecting line between the bead cores on the periphery of the inner tire layer when the bead cores have been secured to the outside surface of the inner tire layer, whereafter the cable or cord is slung around the bead cores and the latter are secured to the outside of the inner tire layer. With that arrangement of the bead cores, the tension of the cable or cord can be adjusted when the cable or cord is spaced from the outside surface of the inner tire layer. The resulting tension will then be exactly as high as the tension which is desired when the bead cores have been secured to the outside surface of the inner tire layer. Owing to this large distance between the inner tire layer and the bead core, even reels on which the cable or cord has been wound can be moved around the bead core and simple machines may be used for that purpose.

In another preferred embodiment of the process according to the invention, the cable or cord, starting from one bead core, is passed in a loop to the other bead core, the loop is slung around the other bead core and the free end of the cable or cord is threaded through the loop so as to form a knot, and this sequence is repeated around the periphery of the bead core until the starting point has been reached and any protruding ends of the cable or cord are cut off. As a result, cables or cords extending parallel to each other and transversely to the peripheral direction are applied in each step. The trailing end of the cord or cable is first tied to one bead core so that a free end remains in a length which is approximately twice the peripheral extent of the bead core. From that bead core the cord or cable is laid over the inner tire layer to the other bead core and is slung around the same so as to form a loop, which is then returned to the first bead core. The loop which has been returned is slung around the first bead core and is secured to it by means of the free end of the cord or cable with formation of a knot. The second part of the cord or cable loop is laid once more over the inner tire layer and slung around the second bead core with formation of a loop, which is returned to the first bead core. The cable or cord may be slung around the second bead core from the outside inwardly and from the inside outwardly in alternation. The loop which has been returned to the first bead core is again tied together with the free end portion with formation of a knot. The sequence is repeated throughout the periphery of the inner tire layer and the ends of the cable or cord are cut off when the last knot has been formed. The operation which has been described is basically known for upholstering furniture.

In an apparatus according to the invention for carrying out the process, a mold assembly for casting or injection molding comprises a central mold core and at least two sets of outer mold sections. The mold sections of the outer set are preferably provided on the inside with annular recesses for molding the annular elevations of the inner tire layer. The mold sections of the second set conform to the outside pattern of the finished tire. The tread portion is preferably molded at the same time as the breaker.

The cable or cord may consist of wires of synthetic fibers or steel, e.g., of polyamides.

Spacers may be provided for properly locating the peripherally extending reinforcement so as to ensure the desired position of the belt in the tire. The spacers have such a cross-sectional shape that they at least partly embrace the belt and have on one side an opening through which the belt can be inserted. In that case the belt need not be tensioned by the spacers because the belt is located in the desired position by the embracing portions of the spacers. The spacers may then be designed so that the width of the web portion or the inside width of the cross-section which receives the belt is selected so that it can accommodate a belt having a width which is at least 10% and preferably not in excess of 50% of the width of the tread portion of the tire. Such a design will be particularly desirable in view of the requirements to be met by the reinforcements of a tire which has been cast or injection-molded in one operation. The distance from the points of contact between the belt and the webs to the inside surface of the inner mold member is preferably about 50% of the smallest wall thickness of the tread portion of the tire. A tire provided with such reinforcement possesses a tire body which has a virtually constant wall thickness and which is adjoined by the tread portion which has been cast or injection-molded and consists of the same material.

Plastic materials which may be used to make the vehicle tire according to the invention include polyurethane, which is preferred, also 6,6 polyamide, polyvinylchloride, polyethylenes or the like as well as rubber mixes which can be injection-molded or cast. The use of these plastic materials is permitted mainly because an appropriate reinforcement is provided.

Figure 1:
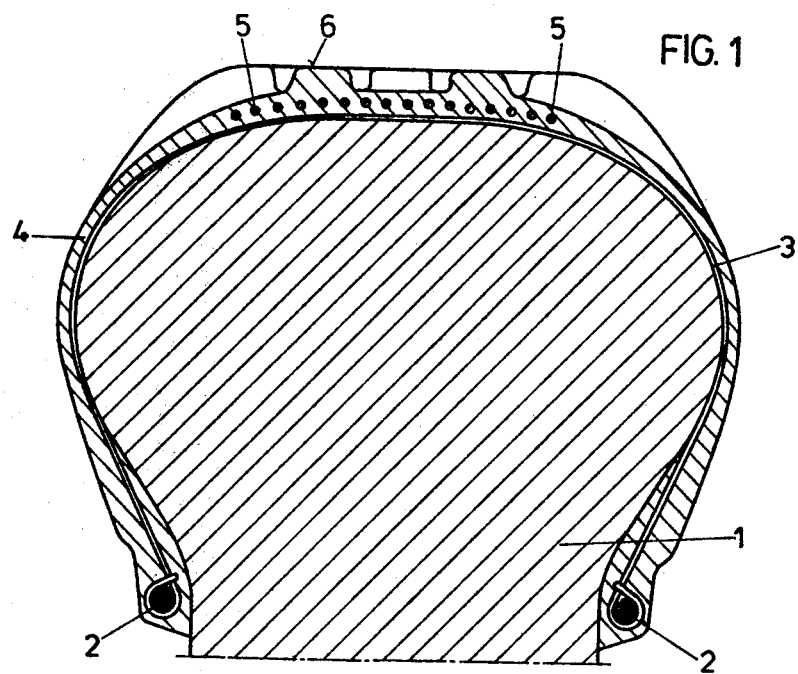

The invention will now be explained more fully with reference to embodiments shown by way of example on the drawing, in which FIG. 1 is a transverse sectional view showing a tire which has been made according to the invention and FIG. 2 is a perspective view showing the arrangement of the cord or cable; the mold core has been omitted for the sake of clearness; FIG. 2 shows diagrammatically also a compensating device.

Figure 3:
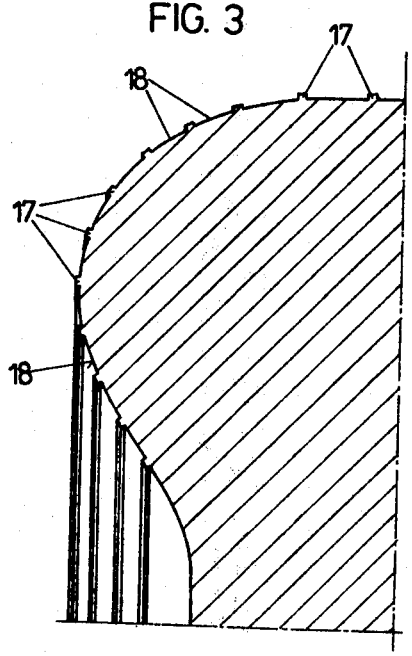
Figure 4:
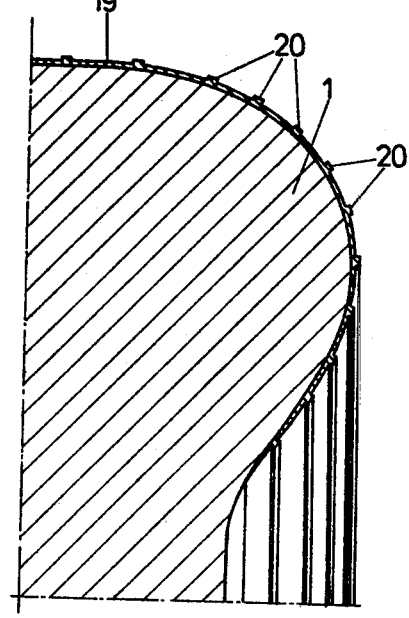

FIGS. 3 and 4 are two transverse sectional views showing mold cores which may be used in the process.

Figure 5:
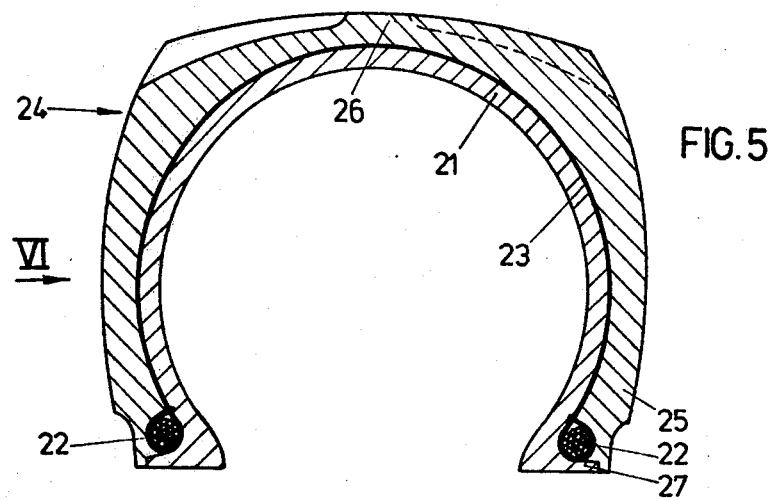
Figure 6:
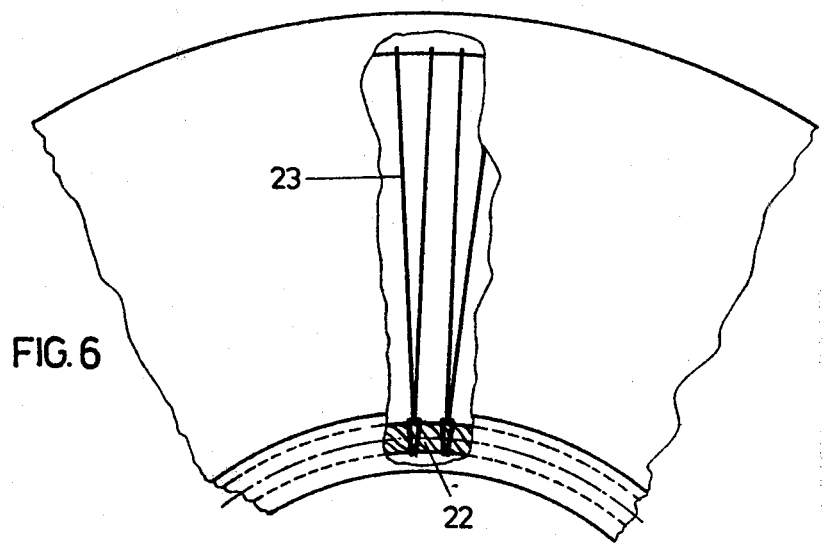
Figure 8:
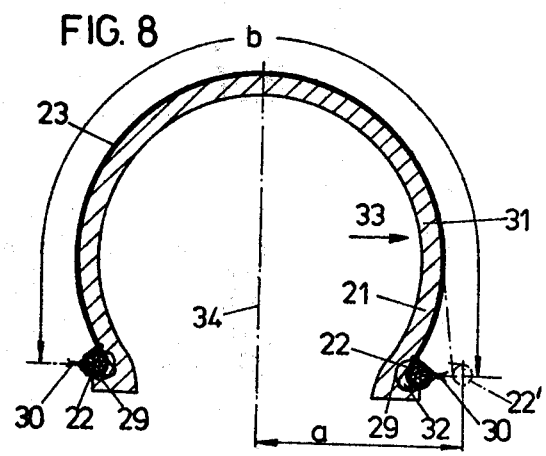
Figure 7:
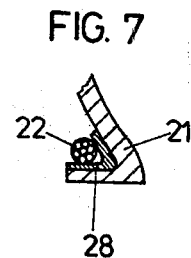
Figure 9:
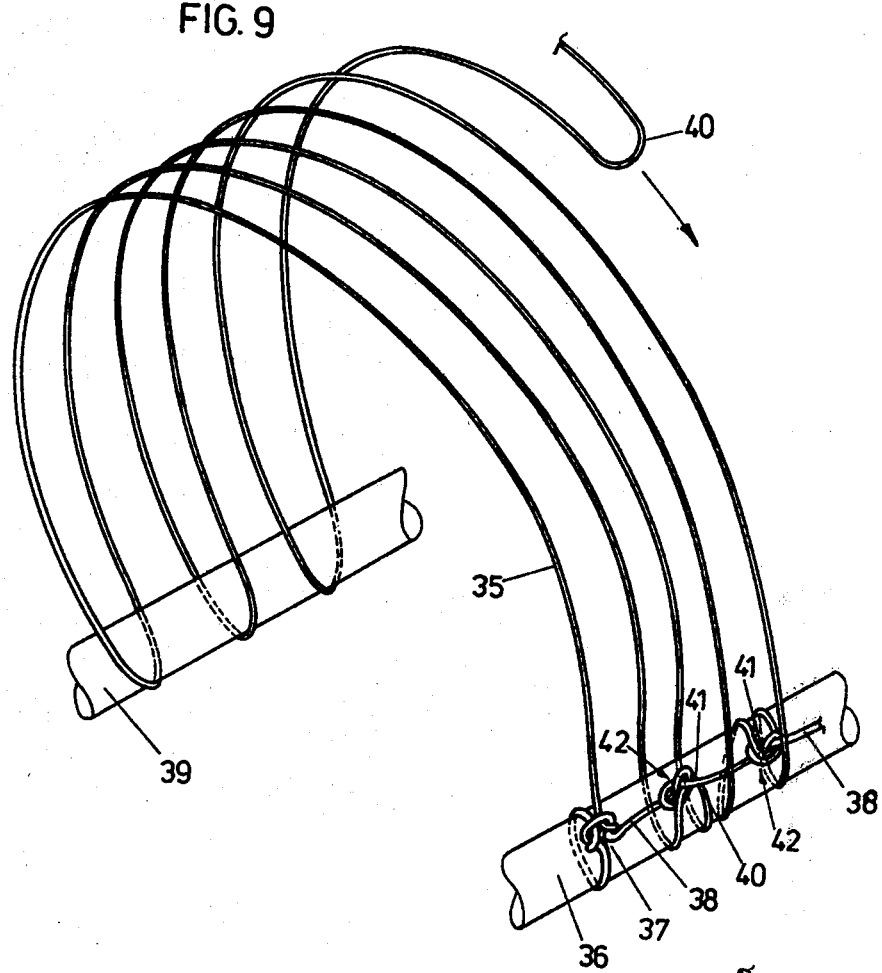
Figure 10:
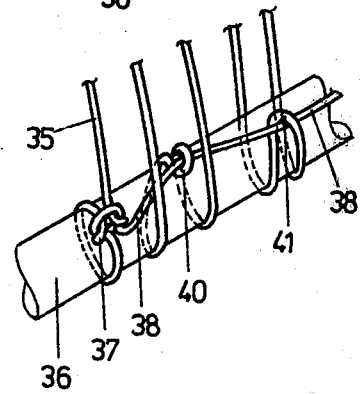

FIG. 5 is a transverse sectional view showing a tire which has been made by the method according to the invention, FIG. 6 an elevation showing the tire of FIG. 5 partly cut open, viewed in the direction of the arrow VI, FIG. 7 a partly sectional view which is similar to FIG. 5 and shows the inner tire layer with inserted spacers before the reinforcing elements are inserted, FIG. 8 a diagrammatic view showing the bead cores around which the cord or cable can be slung when the bead cores are spaced from the outside surface of the inner tire layer, FIG. 9 a perspective view showing a different fixation of the cable or cord to bead cores, and FIG. 10 a side elevation of a modified fixation of the cord or cable to a bead core.

In FIG. 1, a mold core 1 is apparent. The tire body is formed by a cord or cable 3, which has been laid around the bead cores 2. In the cross-section of the tire 4, circumferentially extending reinforcements 5 are indicated below the tread portion 6.

FIG. 2 is a diagrammatic illustration how the cord or cable 3 is withdrawn from a supply reel 7 and guided by rollers 8, 9, 10, which serve to maintain the cord or cable 3 under a constant tension. The intermediate roller 9 is loaded by a weight 11. When the cord or cable is withdrawn while the supply reel 7 is held against rotation, the intermediate roller 9 will rise in the direction of the arrow 12 and will actuate the limit switches 13 and 14. In response to the actuation of the limit switch 13, a brake 15 releases the supply reel 7 for rotation so that the roller 9 can descend as far as to the limit switch 14, which then causes the brake 14 to be applied. The cord 3 is laid around the bead cores 2 with formation of loops 16 and is connected to the bead cores by an operation which is similar to crocheting. As is apparent from the last step which is illustrated, the cord 3 is laid from the left-hand bead core 2 over the periphery of the inner tire layer, not shown, and is threaded through the loop which has been formed in the preceding step and laid around the right-hand bead core 2. In this way, a new loop is formed, through which the cord is threaded when it has been laid over the periphery of the inner tire layer as far as to the other side and threaded through the loop 16 at the left-hand bead core 2 and laid once more over the periphery of the inner tire layer.

As is apparent from FIG. 3, the mold core may be provided on its periphery with peripherally extending ribs 17, which space the tire body from the recessed portions 18 of the peripheral surface of the mold core. In the manufacture of a tire, e.g., from polyurethane, the spaces which have been left may be filled by the molten material which is being poured.

FIG. 4 shows an alternative, in which the mold core 1 is provided with a covering 19 formed with ribs 20. That covering 19 may be made from the same material as the tire, such as polyurethane, and constitutes the inner tire layer.

FIG. 5 shows an inner tire layer 21 which has been cast from polyurethane. The bead cores 22 are embraced by cables or cords 23. To complete the tire 24, the side wall parts 25 and the tread portion 26 are applied. The bead cores 22 are disposed in recesses 27 formed in the inner tire layer 21. As is shown in FIG. 6, the cables or cords 23 have been laid in alternation around the two bead cores 22 disposed on opposite sides of the inner tire layer 21. In the usual manner, the bead core 22 consists of a twisted steel cable closed in itself and the cables or cords 23 consist of cables or wires of plastic material. Beginning at one bead core 22, the cables or cords 23 extend over the periphery of the inner tire layer to the other bead core 22 and from the latter back to the first wire bead 22. The cables or cords 23 are secured to the bead cores 22 in the manner illustrated in FIG. 2 by an operation similar to crocheting. Alternatively, they may be secured in the manner which will now be described with reference to FIG. 9.

FIG. 7 shows spacers 28, which are disposed between the bead cores 22 and the inner tire member 21 and which are pulled out whenever the cables or cords 23 being laid around the bead cores 22 have come into contact with the spacers 28.

FIG. 8 shows the bead core 22 in contact with the inner tire layer 21 and in a position 22'. In a radial direction, the bead core 22 cannot be extended or can be extended only very slightly. The distance a from the bead core in position 22' to the longitudinal center plane of the tire is such that the length of the reinforcing elements b extending from the bead core 22 on one side of the inner tire layer 21 to the bead core in position 22' on the other side of the inner tire layer 21 equals the distance between the bead cores 22 when they are both in contact with the outside surface of the inner tire layer. FIG. 8 shows also anchoring members 29, which become embedded in the inner tire layer 21 as it is cast. The two ends of the anchoring member 29 are connected, e.g., by means of knots 30, so as to enclose the bead cores 22, which are thus held in engagement with the inner tire layer. The cable or cord 23 is slung completely around the bead cores 22.

It will be understood that the process which is diagrammatically illustrated in FIG. 8 can be adopted only when the inner tire layer 21 has a curved portion 31, which has a larger radius than the portion 32 formed with the recess for receiving the bead core 22 and bulges laterally outwardly in the direction of the arrow 33 beyond the portion 32 because only in that case can a point on the outside surface of the inner tire member 21 be spaced from the longitudinal center plane 34 of the inner tire layer by a distance a which is such that the length b of the cable or core 23 equals the length of the cable or cord between the two bead cores 22 when the cable or cord has been fixed in position on the outside peripheral surface of the inner tire layer 21.

The process can be carried out in a simple manner in that a cable or cord loop is passed between the outside surface of the inner tire member 21 and the bead core 22 and laid around the bead core 22 and the free end of the cable or cord 23 is then threaded through the loop.

FIG. 9 shows how the cord or cable can be secured to the bead cores in a different manner, which is similar to a stitching operation or to a weaving operation using a weft. In this way, there will result each time a knot around the bead core. The cord or cable 35 is secured at 37 to a first bead core 36 by a double knot in such a manner that a long free end 38 is left. The cord or cable 35 is then laid over the periphery of the inner tire layer (not shown) or of the forming core and slung around to the other bead core 39.

The cord or cable 35 forms a loop 40 which is drawn under the bead core 39, then pulled over the periphery of the inner layer or the forming core till the first bead core 36, afterwards wound from the inner side of said bead core 36, i.e., the side adjacent the inner layer or the forming core until the loop 40 is aligned with the double knot 37. The crest 41 of the loop 40 is secured to the bead core 36 with the free end 38 of the cord or cable 35 by means of a knot 42.

The cord or cable 35 forms another loop 40 at the bead core 39, said loop being drawn back to the first bead core 36 via the periphery of the inner layer. This new loop 40 is wound around the bead core 36 from the outer side thereof, that is the side opposite to the inner tire layer or the forming core until the new loop 40 is aligned with the first loop or the double knot 37, respectively. The crest 41 of said second-named loop 40 in turn is fixed to the free end 38 of the cord or cable 35 on the bead core 36 by means of a knot 42.

Further loops 40 drawn from the bead core 39 to bead core 36 are wound alternately from the inner and the outer side of the bead core 36 around the same. This is continued until the whole circumference of the inner layer is wrapped with a cord or cable 35.

Pre-tension of the cord or cable 35 can be controlled in a simple manner by more or less strongly tightening the free end 38.

FIG. 10 shows another kind how to fasten the cord or cable 35 on the bead core 36. Again the loop 40 is slung around the bead core 36 alternately from the inner side and the outer side of the same. However, on the contrary to the method like FIG. 9, the loop is not fixed by means of a knot but solely by pulling the free end 38 through the loop 40. Also here the pre-tension of the cord or cable is easily adjustable by tightening the free end 38 with more or less intensity.

I claim:

1. A process of manufacturing pneumatic tires made of synthetic elastomers, particularly of polyurethane, and comprising an inner tire layer, a tire body, which is anchored in the inner tire layer by means of bead cores, a belt, and an outer tire layer provided with a tread portion, said process being characterized in that the tire body is made in that a cord or cable is wound radially from one bead core to the other bead core over the periphery of a forming core but spaced from the surface of said forming core while being anchored in alternation on at least one of the two bead cores provided on both sides of the tire by being completely slung around each bead core, that a peripherally extending belt is applied, and that finally the outer tire layer and the tread portion are applied.

2. A process according to claim 1, characterized in that a radial reinforcement is provided in that the cable or cord is laid under constant tension from one bead core to the other one over the periphery of the inner tube layer and is slung around each bead core so as to form a loop, that the inner tire layer is advanced in the peripheral direction, and that a new loop is formed in an operation which is similar to crocheting in that the cable or cord laid over the periphery of the inner tire layer is threaded through the previously formed adjacent loop and is thus connected to the bead core.

3. A process according to claim 1 or 2, characterized in that the bead cores are spaced from the outside surface of the inner tire layer as the radial reinforcement is applied.

4. A process according to claim 1 in which the inner tire layer has a curved portion which bulges laterally outwardly beyond the bead core to a radius which is larger than the radius of the bead cores, characterized in that at least one bead core is initially arranged at such a distance from the outside surface of the inner tire layer that the shortest connecting line on the periphery of the inner tire layer to the other bead core is as long as the shortest connecting line between the bead cores on the periphery of the inner tire layer when the bead cores have been secured to the outside surface of the inner tire layer, whereafter the cable or cord is slung around the bead cores and the latter are secured to the outside of the inner tire layer.

5. A process according to claim 1 characterized in that the cable or cord (35), starting from one bead core (39), is passed in a loop (40) to the other bead core (36), that the loop (40) is slung around the other bead core (36) and that the free end (38) of the cable or cord (35) is threaded through the loop (40) so as to form a knot (42), and that this sequence is repeated around the periphery of the bead core until the starting point has been reached, whereunto any protruding ends of the cable or cord are cut off.

6. A process according to claim 1 characterized in that the circumferentially extending belt is introduced as a prefabricated annular belt closed in itself.

7. A process according to claim 1 characterized in that the peripherally extending belt is made by winding a cable or cord around the tire body.

8. A process according to claim 1 characterized in that the inner tire layer is formed with annular elevations.

9. An apparatus for carrying out the process according to claim 1 characterized in that a mold assembly for casting or injection molding comprises a central mold core (1) and at least two sets of outer mold sections, the mold core (1) being conform to the finished tire (4), and that a set of symmetrically arranged outer mold sections are used for making the inner tire layer (21) which are provided on the inside with annular recesses so as to form annular elevations (17) on the outside of the inner tire layer.

10. The apparatus according to claim 9, characterized by means for holding the bead cores in positions and spaced from the outside surface of the inner tire layer (21) as the radial reinforcement (23) is made.

11. The apparatus according to claim 9 or 10, characterized by compensating means (8, 9, 10, 11, 13, 14) for maintaining a constant tension of a cable or cord (3) which is being withdrawn from a reel (7) or supply drum and is used to make the radial reinforcement.

12. The apparatus according to claim 9 characterized by weblike spacers (39, 42, 49, 52, 55, 57) which embrace at least in part the circumferential belt (40).

13. The apparatus according to claim 9 characterized in that the central mold core (1) is provided with peripherally extending ribs (17) projecting from the surface (18) of the mold core.

* * * * *